United States Patent
Nishiguchi et al.

[11] Patent Number: 6,167,144
[45] Date of Patent: Dec. 26, 2000

[54] IMAGE PROCESSING APPARATUS AND IMAGE PROCESSING METHOD FOR IDENTIFYING A LANDING LOCATION ON THE MOON OR PLANETS

[75] Inventors: Kenichi Nishiguchi; Shoji Yoshikawa, both of Tokyo, Japan

[73] Assignee: Mitsubishi Denki Kabushiki Kaisha, Tokyo, Japan

[21] Appl. No.: 09/185,513

[22] Filed: Nov. 4, 1998

[30] Foreign Application Priority Data

Nov. 5, 1997 [JP] Japan ................................ 9-303082

[51] Int. Cl.[7] .......................................... G06K 9/00
[52] U.S. Cl. .................... 382/108; 382/181; 340/947; 340/953
[58] Field of Search .................... 382/108, 181, 382/113; 342/36; 244/138 R, 55, 75 R, 118.1, 158 R; 340/953, 947; 367/116; 250/214 P, 522; 706/16

[56] References Cited

U.S. PATENT DOCUMENTS

| | | | |
|---|---|---|---|
| 3,778,821 | 12/1973 | Young | 343/5 |
| 4,495,589 | 1/1985 | Hirzel | 324/160 |
| 4,792,904 | 12/1988 | Reinagel et al. | 364/429 |
| 4,979,154 | 12/1990 | Brodeur | 367/116 |
| 5,351,898 | 10/1994 | Koehn | 244/118 |
| 5,374,932 | 12/1994 | Wyschogrod et al. | 342/36 |
| 5,519,618 | 5/1996 | Kastner et al. | 364/439 |
| 5,654,890 | 8/1997 | Nicosia et al. | 342/26 |
| 5,719,949 | 2/1998 | Koeln et al | 382/113 |
| 5,940,014 | 8/1999 | Hartt | 340/953 |
| 5,982,299 | 11/1999 | Shemwell | 340/953 |

FOREIGN PATENT DOCUMENTS 8181976  7/1996  Japan ............................. H04N 7/18

OTHER PUBLICATIONS

Virtual lunar landscapes for testing vision lunar landers, by Parkes et al, IEEE, 1999.
Soft landing on a planet: A trajectory planning approach for the liouvillian model, by Ramirez, IEEE, 1999.
Ogasawara, M. et al.; "Method of Obstacles Detection and Avoidance for Moon Landing", Lunar Sci. Conf. 8th., pp. 265–266.

Primary Examiner—Matthew C. Bella
Assistant Examiner—M B Choobin
Attorney, Agent, or Firm—Leydig, Voit & Mayer, Ltd.

[57] ABSTRACT

An image processing apparatus and method for identifying a safe landing location on the surface of the moon or planets calculates local average brightness and brightness variance in a neighborhood of each image pixel based on a digital image data obtained with a camera and determines whether each pixel represents a level and flat area based on the local average brightness and brightness variance calculated for each pixel, thereby extracting a desirable landing site.

12 Claims, 10 Drawing Sheets

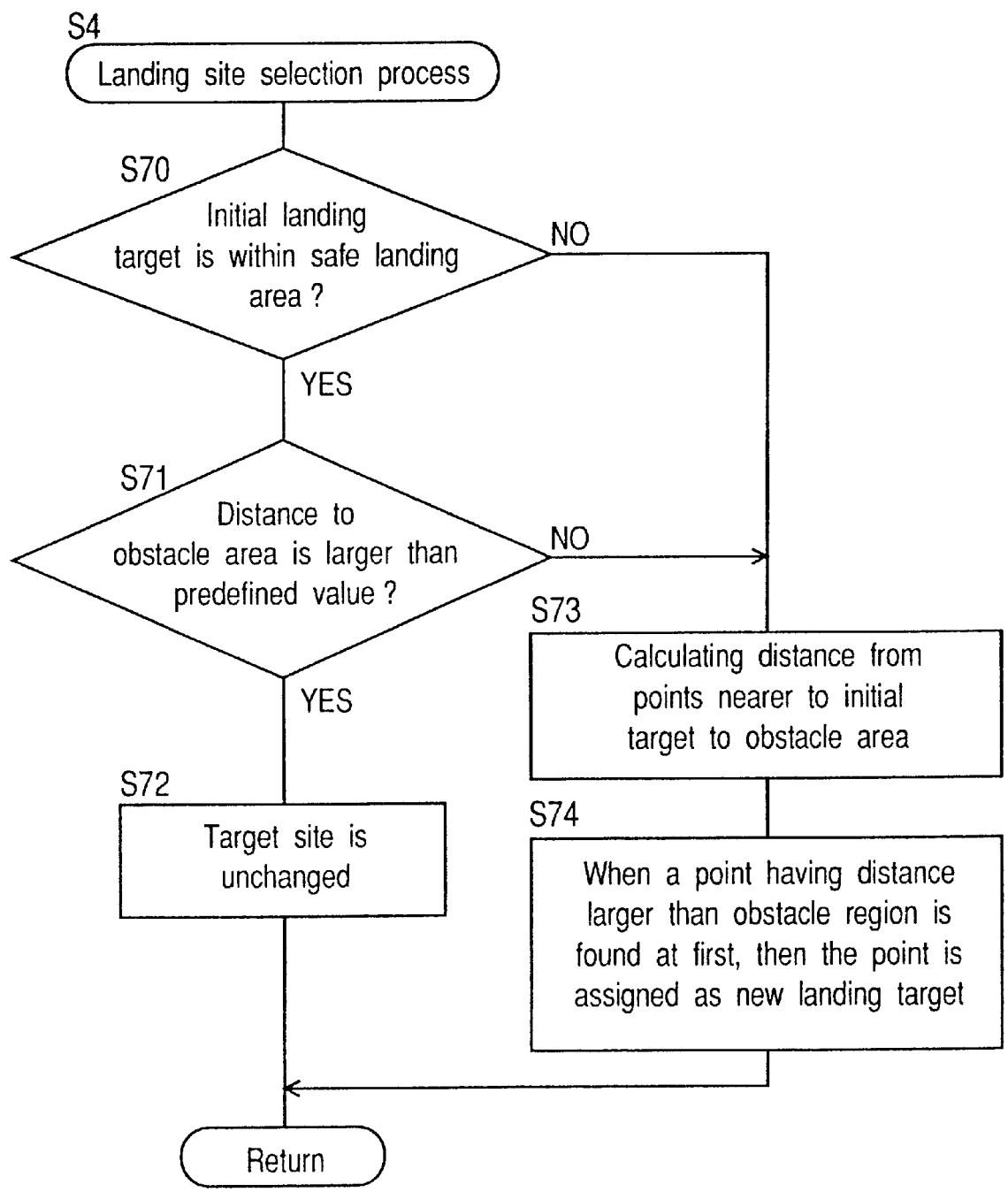

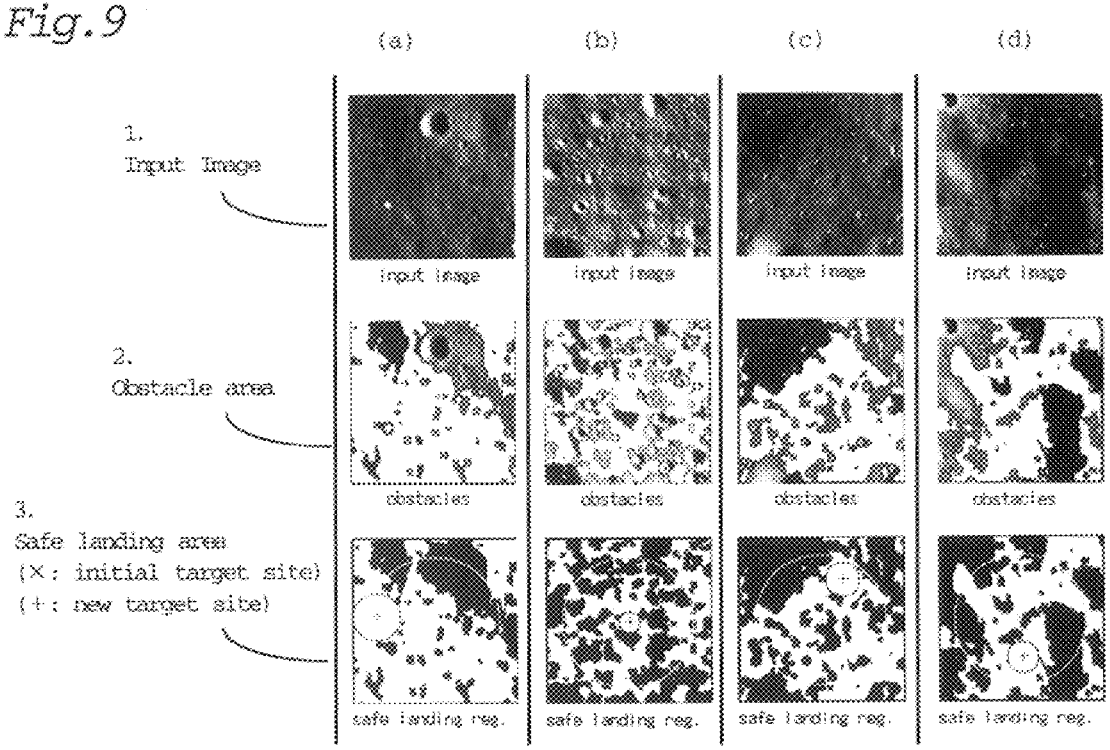

*Fig.10A*
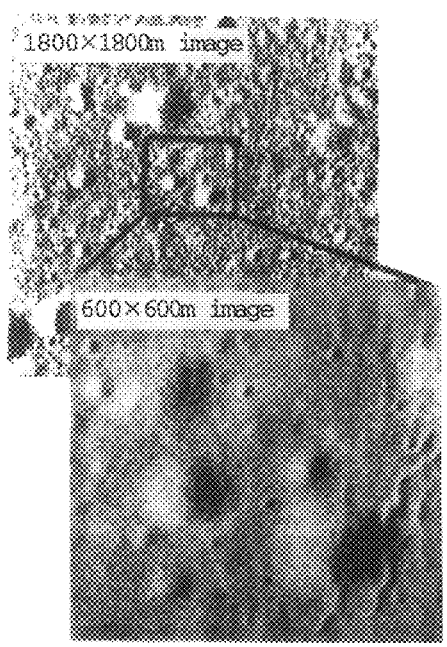
Simulation for avoiding obstacles
*Fig.10B*
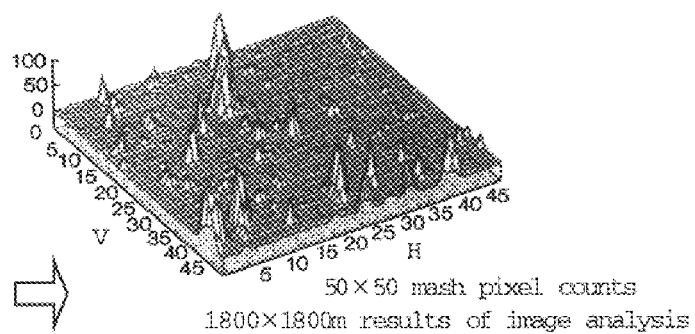
50 × 50 mash pixel counts
1800×1800m results of image analysis
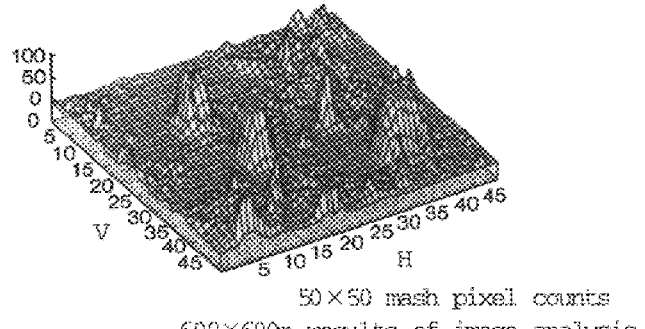
50 × 50 mash pixel counts
600×600m results of image analysis

IMAGE PROCESSING APPARATUS AND IMAGE PROCESSING METHOD FOR IDENTIFYING A LANDING LOCATION ON THE MOON OR PLANETS

BACKGROUND OF THE INVENTION

1. Field of the Invention

The present invention relates to an image processing apparatus and an image processing method for selecting, based on an image of the surface of the moon or planets, a landing spot for a landing craft such as an unmanned exploration vehicle.

2. Description of the Related Art

When an unmanned explorer or other type of unmanned space craft lands on the moon or planets, avoiding surface obstacles at the landing site is essential to making a safe landing. This is particularly important when an unmanned explorer or other unmanned craft attempts an autonomous landing in an area for which detailed topographical data is not available. This is because the landing craft could topple over if a leg of the landing craft, for example, contacts a large obstacle at the landing site.

Devices for identifying obstacles that could obstruct a safe landing as a means of identifying a safe landing site have been proposed in the literature. Such devices typically capture an aerial image of a potential landing area using an optical, laser or, millimeter waves, or other method, and detect obstacles based on the resulting image data.

A landing site identification device as taught in Japanese Patent Laid-Open Publication No. 8-181976, for example, uses a camera to photograph a potential landing site, identifies shadows based on the resulting image data, and recognizes the detected shadows as areas where landing is not possible (unlandable areas). When identification of unlandable areas is completed, an area where landing is possible (landable area) is detected and the center of the identified landable area is defined as the landing site. The landable area in this case is determined by seeking a site in which a landing site error circle, determined by the guidance precision of the landing craft, does not overlap an unlandable area.

Another obstacle detection method is taught in the paper "An examination of obstacle detection and avoidance methods for lunar surface landing" by Ogasawara et al. (40th Joint Symposium of Space Science and Technology, 2A05, 1997; in Japanese).

FIG. 10 is a figure included in the above paper by Ogasawara et al. FIG. 10A shows an image from a photograph of the lunar surface, the top image covering an area 1800×1800 m, and the lower image showing a 600×600 m section from the middle of the upper image. The top and bottom 3D graphs shown in FIG. 10B correspond to the top and bottom images shown in FIG. 10A. The graphs were obtained by dividing the images in FIG. 10A into pixel matrices, and counting the number of pixels with brightness below a specified threshold value in each pixel matrix. The Z-axis of each graph shows the pixel count in each matrix, and the X and Y axes represent the X and Y coordinate positions of each pixel matrix in the corresponding image.

The obstacle detection method taught in the above paper is designed specifically for detecting craters with a diameter of 2 m or more. When the pixel count in a given matrix exceeds a specific threshold value, the corresponding pixel matrix is determined to belong to a shadow area. Crater location and size are then estimated using the resulting shadow area information, solar declination, and crater model.

As described above, a typical conventional image processing device for enabling a safe lunar or planetary landing determines the presence of any obstacles based solely on information about areas containing shadows with a low brightness level. This method can therefore be effectively used to detect anticipated obstructions such as rocks projecting from flat surfaces, and specific obstacles, such as craters, that match the shape of defined models. It is difficult, however, to detect unanticipated obstacles and obstacles that are hard to model, including, for example, overlapping craters that do not conform to the crater model.

There is therefore a need for an image processing apparatus and image processing method whereby all types of surface formations and objects that may be an obstacle to a safe landing can be avoided during landing by a landing craft based on an image of the area around a landing site.

SUMMARY OF THE INVENTION

To meet the above described need, according to the present invention, an image processing apparatus for enabling a safe, soft landing on the moon or planets comprises an imaging unit and a landing site extraction means. The imaging unit captures an image of an area around a scheduled landing site, and outputs digital image data indicative of image brightness. The landing site extraction means performs a neighborhood process in which each pixel in the image is a center pixel to calculate for each pixel local average and variance values of image pixel data in a neighborhood of a center pixel based on digital image data supplied from the imaging unit. A region in which landing is possible is then extracted by determining whether each center pixel belongs to a level and flat area based on the obtained local average and variance values.

In an image processing apparatus according to a further aspect of the invention, the landing site extraction means comprises a calculation means and an evaluation means. The calculation means performs a neighborhood process in which each pixel in the image is a center pixel; this neighborhood process obtains local average and variance values of image pixel data in a neighborhood of a center pixel, and obtains a local moment of inertia, defined as the sum of the local variance values and the square of a difference between said local average value and a reference brightness value for a level surface. The evaluation means determines that the center pixel is in a level and flat area when the local moment of inertia calculated by the calculation means is less than or equal to a specific threshold value.

In a further aspect of the image processing apparatus, the neighborhood process of the calculation means obtains just local average and variance values of image pixel data in a neighborhood of a center pixel. In this case, the evaluation means determines that the center pixel is in a level area when a difference between the local average and a reference brightness for a level surface is within a specific range, and determines that the center pixel is in a flat area when the local variance value is less than or equal to a specific threshold value.

In a yet further aspect of the image processing apparatus, the neighborhood process of the calculation means obtains local variance values of image pixel data in a neighborhood of a center pixel, recognizes shadows in the image based on said image data, and calculates a slope at each image pixel from a recognized shadow. The evaluation means in this case determines that the center pixel is in a flat area when the local variance value is less than or equal to a specific threshold value, and determines that the center pixel is in a level area when the calculated slope is within a specific range.

Another aspect of an image processing apparatus according to the present invention further comprises a landing site selection means for recognizing a level and flat area based on an evaluation result from the evaluation means, and selecting as a new landing site a center point of a circular area having the greatest diameter of all circular areas that can be assured in the recognized region.

The landing site selection means in yet another aspect selects as a new landing site a center point of a circular area that has a diameter equal to or greater than a specific value, and is closest to the scheduled landing site of all circular areas that can be assured in the recognized region.

The present invention also meets the above-noted needs by means of an image processing method. These image processing methods correspond substantially to the image processing apparatuses described briefly above, and will become further known from the following detailed description of the invention and the accompanying claims.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which:

FIG. 8 is a flow chart of a second landing site selection process performed as step S4 in FIG. 2;

FIG. 9 shows the results of a landing site selection process according to the present invention when applied to image data from the corresponding lunar surface photographs shown in the first row (a) to (d); and FIGS. 10A and 10B are an explanatory view used to describe a conventional obstacle detection method.

DESCRIPTION OF THE PREFERRED EMBODIMENTS

An image processing apparatus according to the present invention for enabling a safe landing on the surface of the moon or planets extracts an area in which landing is possible by obtaining digital image data related to the image brightness in the area of the intended landing site, and using a neighborhood process in which each pixel in the image is used as the central pixel of the neighborhood process. This neighborhood process obtains the localized mean and variance values of image pixel data around each central pixel, and based on these localized mean and variance values determines whether the central pixel is associated with a level, smooth area to extract an area in which landing is possible.

A preferred embodiment of an image processing apparatus thus comprised is described in detail below with reference to the accompanying figures.

(1) Overall Configuration

Figure 1:
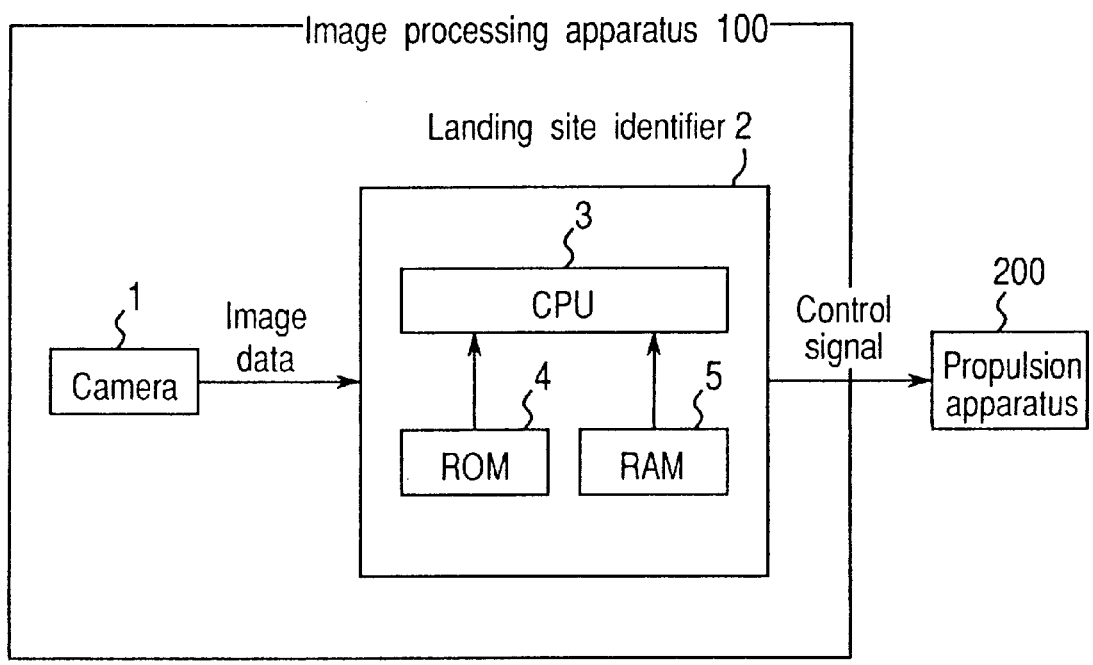
FIG. 1 is a function block diagram of an image processing apparatus according to a preferred embodiment of the present invention.

FIG. 1 is a function block diagram including an image processing apparatus 100 according to a preferred embodiment of the present invention. The image processing apparatus 100 comprises a camera 1 and a landing site identifier 2. The camera 1 captures an image of a specific area around an initial candidate landing site for the landing craft, and outputs digital image data relating to the brightness of the photographed image. The landing site identifier 2 comprises primarily a central processing unit (CPU) 3, ROM 4, and RAM 5. The ROM 4 stores an application program and data needed for landing site identification. The RAM 5 temporarily stores parts of the data and program stored in the ROM 4, and digital image data from the camera 1.

While described more fully further below, the landing site identifier 2 processes the brightness-related digital image data to extract flat, level areas as landable areas, selects a site in the extracted area where the safest landing is possible, and then outputs a specific control signal for identifying the selected landing target.

The landing craft propulsion apparatus 200 controls the location of the landing craft so that the craft lands at the site indicated by the control signal.

(2) Main Routine

Figure 2:
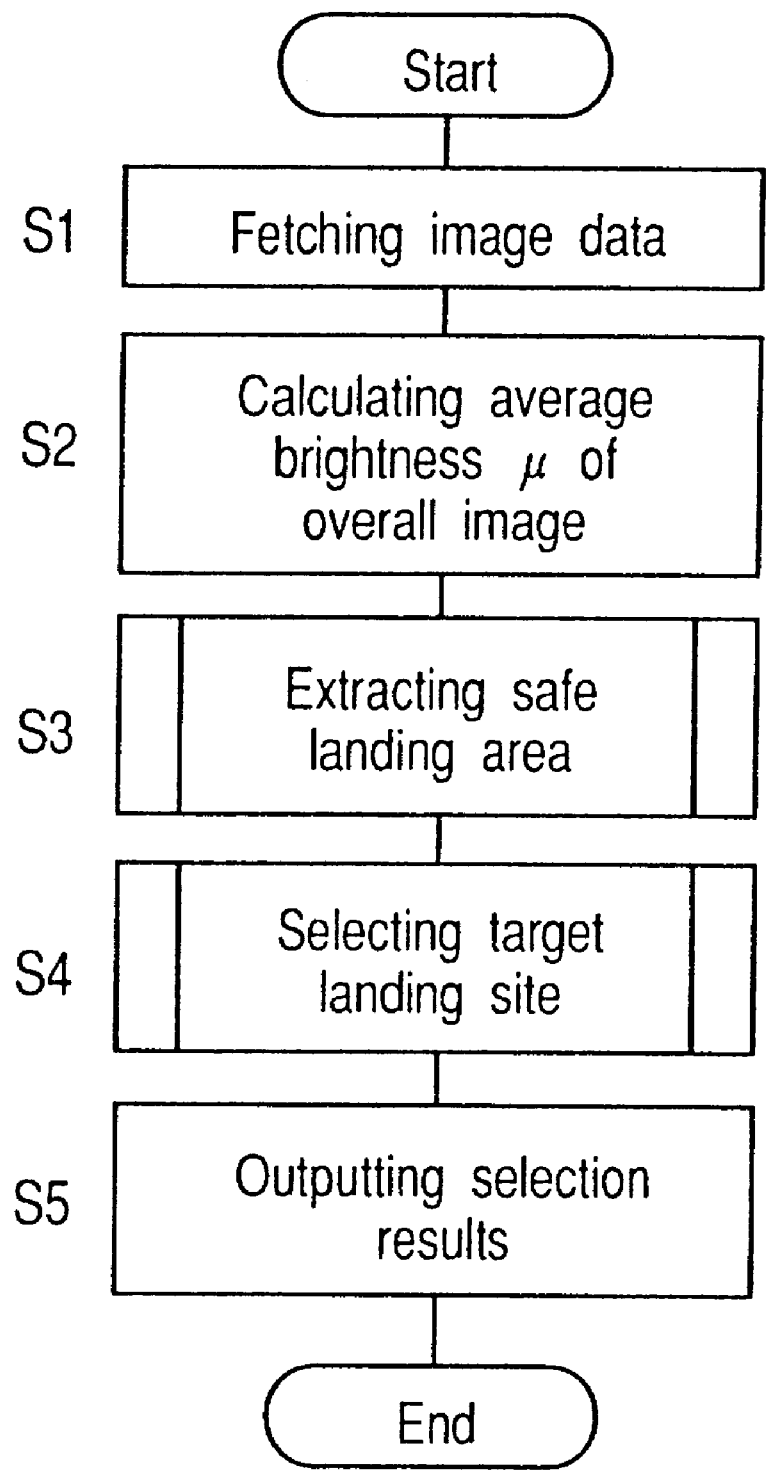
FIG. 2 is a flow chart of the main routine of the landing site selection process performed by the image processing apparatus shown in FIG. 1.

FIG. 2 is a flow chart of the main routine in the landing site selection process implemented by a CPU 3 comprising a landing site identifier 2 as described above.

Digital image data relating to image brightness in the area around the target landing site is first captured and output by the camera 1 (step S1). The average brightness $\mu$ of the overall image is then obtained as the reference brightness of a level surface (step S2). A region in which landing is possible is then extracted (step S3) based on image data relating to the brightness of each pixel. The extraction process used in this step is described in detail further below. Next, based on information about the extracted landable sites, a target landing site where the landing craft can land safely is selected (step S4). This selection process is also described in detail further below. A specific control signal indicative of the selected target landing site is then output as the result of the landing site selection process to the downstream propulsion device 200 (step S5).

(3) Extracting Safe Landing Areas

Three different methods that can be used for the safe landing area extraction process performed in step S3 of FIG. 2 are described in order below with reference to the flow charts thereof shown in FIGS. 4 to 6.

(3-1) First Safe Landing Area Extraction Process

In the first safe landing area extraction process each image pixel is sequentially treated as the center pixel of a 15×15 pixel matrix neighborhood process. As shown in equation 1 below, brightness $Z_{ij}$ of each pixel $A_{ij}$ in the 15×15 pixel matrix is detected, and the average brightness $\mu$ of the overall image is calculated as the reference brightness of the level surface. The sum of the square of the difference between brightness $Z_{ij}$ and average brightness $\mu$ is then calculated for each pixel $A_{ij}$, and divided by the area of the pixel matrix, that is, 15×15=225, to obtain the local moment of inertia $V_{ij}$. Safe landing areas are then detected based on the these moment of inertia $V_{ij}$ values.

$$V_{ij} = \frac{1}{15 \times 15} \sum_{J=j-7}^{j+7} \sum_{I=i-7}^{i+7} (Z_{IJ} - \mu)^2 \qquad \langle \text{Equation 1} \rangle$$

Note that the size of the pixel matrix shall not be limited to 15×15, and equation 1 generalized to obtain the moment of inertia $V_{ij}$ for a matrix of any size n×n is shown as equation 2 below.

$$V_{ij} = \frac{1}{n \times n} \sum_{J=j-(n-1)/2}^{j+(n-1)/2} \sum_{I=i-(n-1)/2}^{i+(n-1)/2} (Z_{IJ} - \mu)^2 \qquad \langle \text{Equation 2} \rangle$$

The significance of this moment of inertia is described next below.

First, the average brightness $\mu_{ij}$ (referred to below as local average $\mu_{ij}$) of each 15×15 pixel matrix of which the center pixel is pixel $A_{ij}$ is calculated using equation 3 below.

$$\mu_{ij} = \frac{1}{15 \times 15} \sum_{J=j-7}^{j+7} \sum_{I=i-7}^{i+7} Z_{IJ} \qquad \langle \text{Equation 3} \rangle$$

The brightness variance $\sigma^2_{ij}$ (referred to below as local variance $\sigma^2_{ij}$) in each 15×15 pixel matrix is then calculated using equation 4.

$$\sigma^2_{ij} = \frac{1}{15 \times 15} \sum_{J=j-7}^{j+7} \sum_{I=i-7}^{i+7} (Z_{IJ} - \mu_{ij})^2 \qquad \langle \text{Equation 4} \rangle$$

Figure 3:
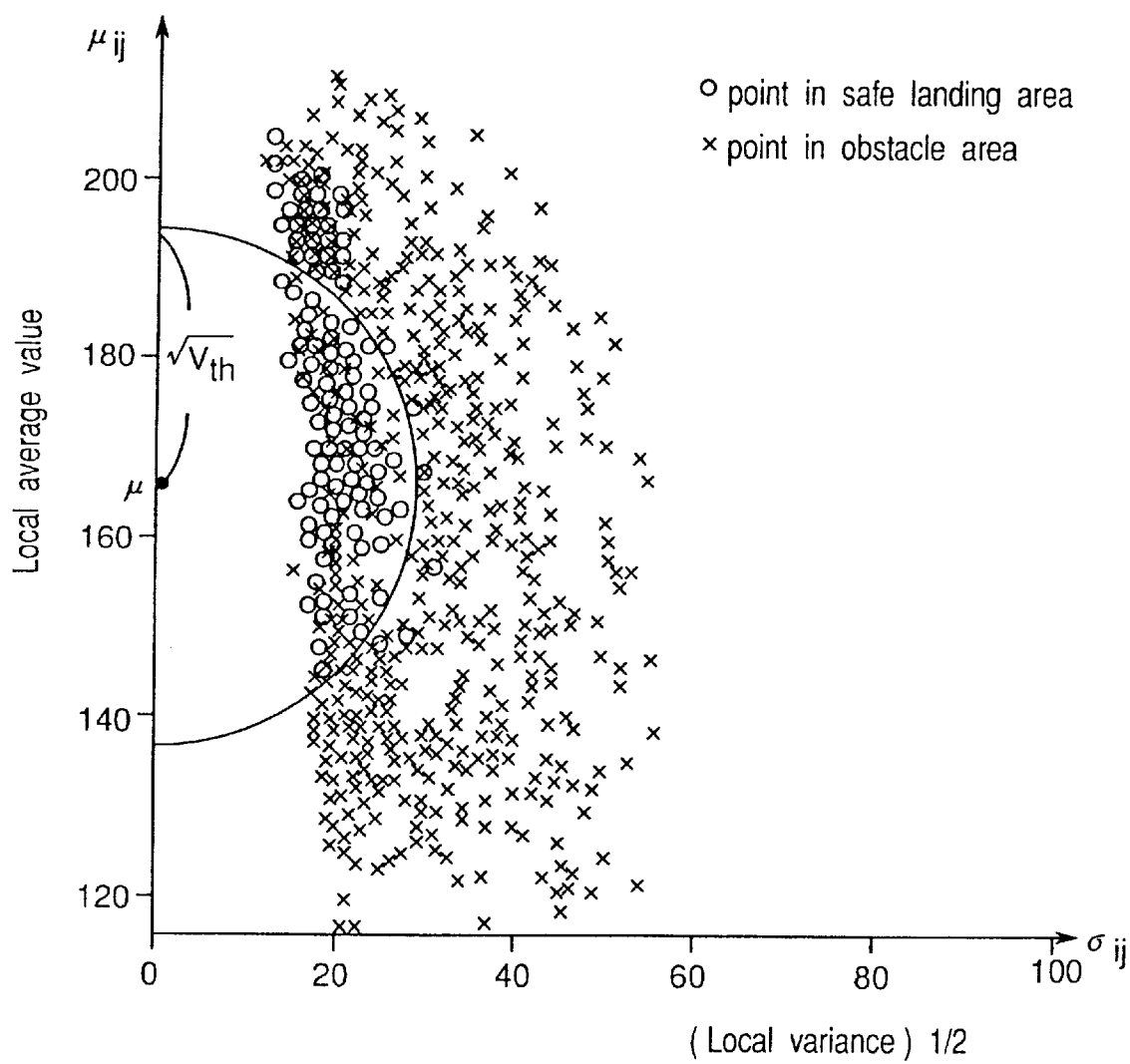
FIG. 3 is a graph showing the relationship between the local standard deviation $\sigma_{ij}$ and local average $\mu_{ij}$ obtained for a sample image.

FIG. 3 shows the relationship between local average $\mu_{ij}$ and the local standard deviation $\sigma_{ij}$, which is the square root of the local variance $\sigma^2_{ij}$ obtained from equations 3 and 4 above. Note that the values plotted in FIG. 3 were obtained using data from a sample image containing information about known safe landing areas and obstacle areas where landing is not possible. Points plotted with an open circle (o) in FIG. 3 show the relationship between local standard deviation $\sigma_{ij}$ and local average $\mu_{ij}$ obtained by applying equations 3 and 4 to pixel data in safe landing areas. Points plotted with an (x) show the relationship between local standard deviation $\sigma_{ij}$ and local average $\mu_{ij}$ obtained by applying equations 3 and 4 to pixel data in regions where obstacles prevent safe landing.

As will be understood from the figure, there is a regular trend in the variance of pixels for a smooth, level area where landing is possible, and pixels for obstructed regions where obstacles prevent safe landing. More specifically, the variance of pixels in safe landing areas is concentrated in a circle of a specific radius around the average brightness $\mu$ of the overall image.

The definition of the local moment of inertia $V_{ij}$ calculated from equation 1 above can be modified as shown in equation 5 below.

$$V_{ij} = \sigma^2_{ij} + (\mu_{ij} - \mu)^2 \qquad \langle \text{Equation 5} \rangle$$

As will be known from equation 5, the local moment of inertia $V_{ij}$ is equal to the square of the distance from point $(0, \mu)$. A contour line of the local moment of inertia $V_{ij}$ will therefore be concentric to a circle with the center at point $(0, \mu)$. The semicircle shown in FIG. 3 corresponds to a local moment of inertia threshold value Vth. The value of threshold value Vth is experimentally determined based on a plurality of sample images. The process described below can determine whether a pixel $A_{ij}$ belongs to a level, flat safe landing area when the value of the local moment of inertia $V_{ij}$ is equal to or less than the threshold value Vth.

Figure 4:
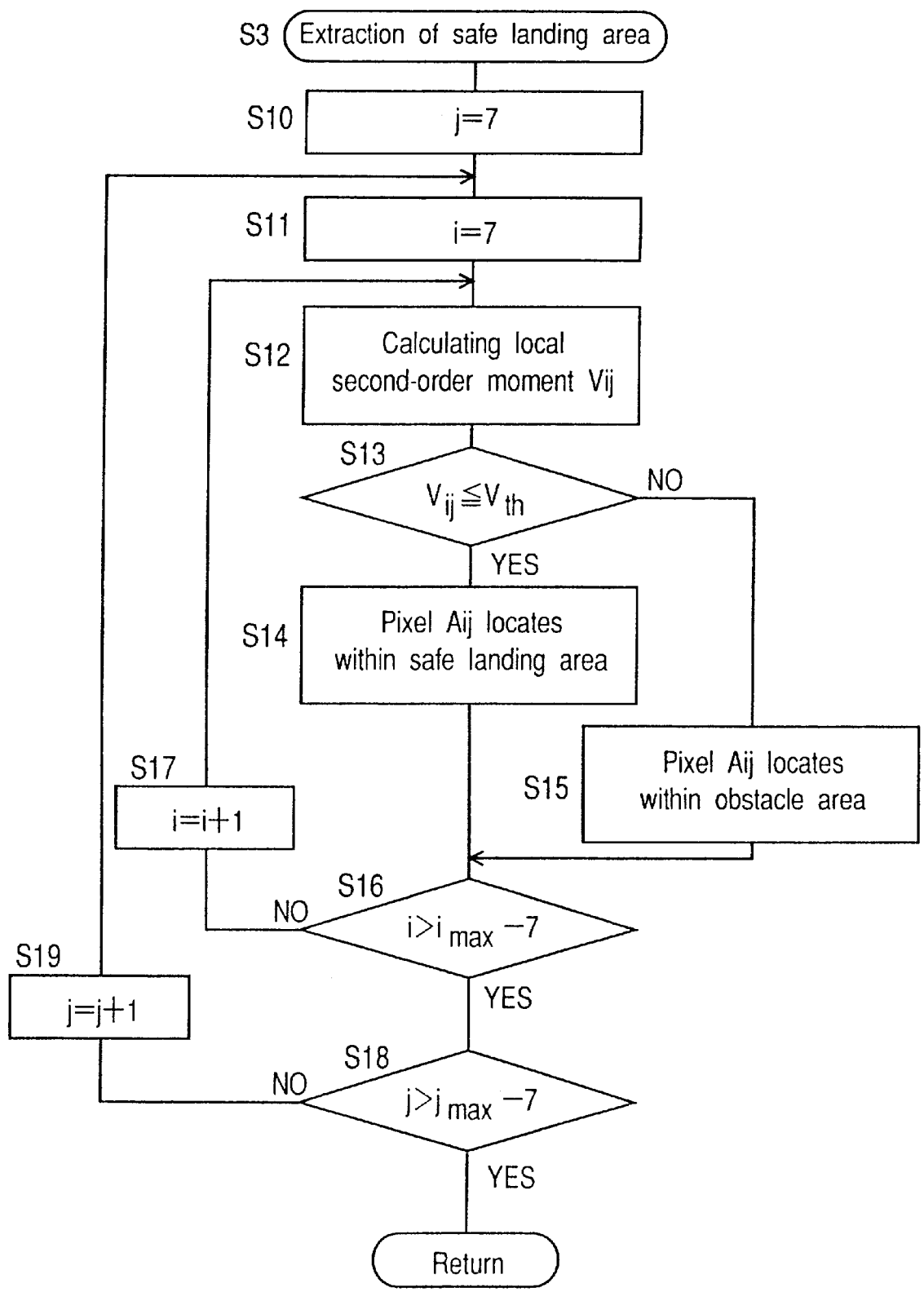
FIG. 4 is a flow chart of a first safe landing area extraction process performed as step S3 in FIG. 2.

FIG. 4 is a flow chart of a first safe landing area extraction process.

This process starts by initializing variables j and i, which are used to specify the center pixel $A_{ij}$ for the neighborhood process, to j=7 (step S10) and i=7 (step S11). Note that variables i and j are initialized to 7 simply to perform the neighborhood process on a 15×15 pixel matrix. For a pixel matrix of n×n, variables i and j are initialized to (n−1)/2. Note that this also applies to the second and third safe landing area extraction processes described further below.

The local moment of inertia $V_{ij}$ is then calculated from either of equations 1 or 5 using the brightness value $Z_{ij}$ for each pixel in the 15×15 pixel matrix of which the center is pixel $A_{ij}$ (step S12).

The local moment of inertia $V_{ij}$ obtained for pixel $A_{ij}$ in step S12 is then compared with the threshold value Vth (step S13). If moment of inertia $V_{ij}$ is less than or equal to the threshold value Vth (step S13=yes), the corresponding pixel $A_{ij}$ is determined to be associated with a smooth, level safe landing area (step S14). However, if the moment of inertia $V_{ij}$ is greater than the threshold value Vth (step S13=no), the corresponding pixel $A_{ij}$ is determined to be associated with an obstructed region (step S15).

The variables are then tested and adjusted as described below so that the attributes of each pixel in the image are evaluated based on the neighborhood process and calculation results obtained as described above for every pixel in the image.

More specifically, if variable i has not been incremented to the value ($i_{max}$−7), where $i_{max}$ is the highest x coordinate value in the image (step S16=no), variable i is incremented by one (i=i+1) (step S17), and the procedure then loops back to step S12. If variable i has been incremented to the value ($i_{max}$−7) (step S16=yes), variable j is similarly tested. That is, if variable j has not been incremented to the value ($j_{max}$−7), where $j_{max}$ is the highest y coordinate value in the image (step S18=no), variable j is incremented by one (j=j+1) (step S19), and the procedure then loops back to step S11. When both variable i has been incremented to the value ($i_{max}$−7) (step S16=yes), and variable j has been incremented to the value ($j_{max}$−7) (step S18=yes), the process has been completed for every pixel in the image, and the safe landing area extraction process returns to the main routine shown in FIG. 2.

(3-2) Second Safe Landing Area Extraction Process

In the second safe landing area extraction process described below, it is determined, based on the local average $\mu_{ij}$ obtained from equation 3 above, whether the region in which pixel $A_{ij}$ is located is level. It is then determined based on the local variance $\sigma^2_{ij}$ obtained from equation 4 whether the region in which pixel $A_{ij}$ is located is smooth.

Figure 5:
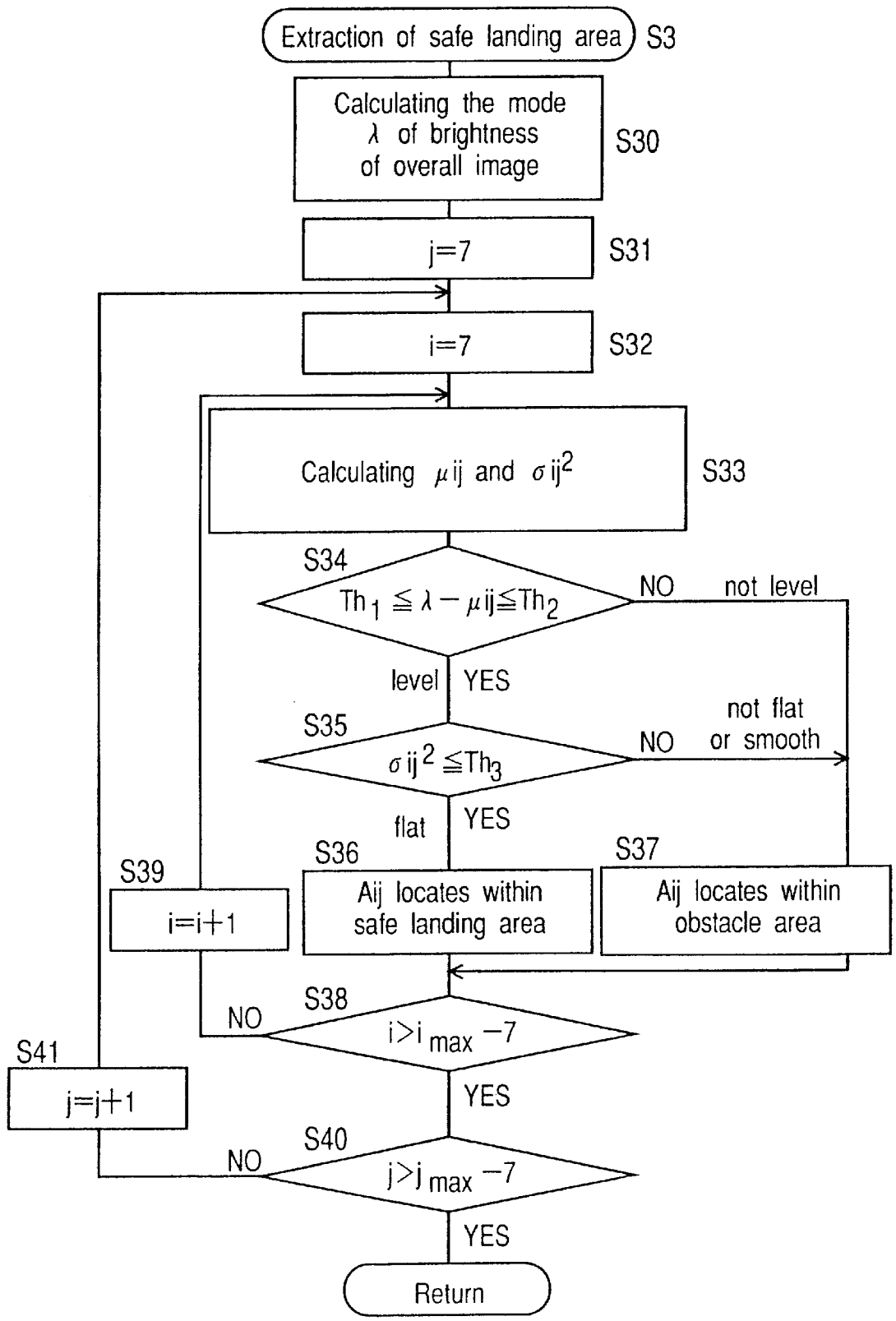
FIG. 5 is a flow chart of a second safe landing area extraction process performed as step S3 in FIG. 2.

FIG. 5 is a flow chart of a safe landing area extraction process according to a second version of the invention.

The first step in this process is to obtain the maximum frequency λ of the brightness values for the overall image (step S30). The variables j and i, which are used to specify the center pixel $A_{ij}$ for the neighborhood process, are then initialized to j=7 (step S31) and i=7 (step S32).

The following 15×15 pixel matrix neighborhood process is then applied to the area around center pixel $A_{ij}$. More specifically, the average brightness $\mu_{ij}$ (referred to below as local average $\mu_{ij}$) of each 15×15 pixel matrix of which the center pixel is pixel $A_{ij}$ is calculated using the above equation 3, and then the brightness variance $\sigma^2_{ij}$ (referred to below as local variance $\sigma^2_{ij}$) in each 15×15 pixel matrix is calculated using equation 4 (step S33).

The difference between the local average $\mu_{ij}$ and the overall average brightness $\mu$ of the entire image, which is obtained as the reference brightness of a level surface, is then compared with threshold values Th1 and Th2. If this difference is greater than or equal to Th1 and less than or equal to Th2, the area of the pixel matrix is determined to be level (step S34=yes). The local variance $\sigma^2_{ij}$ is then compared with a third threshold value Th3. If the local variance $\sigma^2_{ij}$ is less than or equal to Th3, the area within the pixel matrix is also determined to be smooth (step S35=yes). If both steps S34 and S35 return yes, the pixel $A_{ij}$ is determined to be in a region that is both level and smooth, and is therefore in a safe landing area (step S36=yes). If either step S34 or S35 returns no, the pixel $A_{ij}$ is determined to be in an obstructed region in which safe landing is not possible (step S37).

The variables are then tested and adjusted as described below so that the attributes of each pixel in the image are evaluated based on the neighborhood process and calculation results obtained as described above for every pixel in the image.

More specifically, if variable i has not been incremented to the value ($i_{max}$–7), where $i_{max}$ is the maximum x coordinate value in the image (step S38=no), variable i is incremented by one (i=i+1) (step S39), and the procedure then loops back to step S33. If variable i has been incremented to the value ($i_{max}$–7) (step S38=yes), variable j is similarly tested. That is, if variable j has not been incremented to the value ($j_{max}$–7), where $j_{max}$ is the maximum y coordinate value in the image (step S40=no), variable j is incremented by one (j=j+1) (step S41), and the procedure then loops back to step S32. When both variable i has been incremented to the value ($i_{max}$–7) (step S38=yes), and variable j has been incremented to the value ($j_{max}$–7) (step S40=yes), the process has been completed for every pixel in the image, and the safe landing area extraction process returns to the main routine shown in FIG. 2.

(3-3) Third Safe Landing Area Extraction Process

Instead of using local averages, a third safe landing area extraction process according to the present invention recognizes shadowed areas in the image data based on the brightness distribution in the overall image, and then estimates the slope θ of each point from the recognized shadows. More specifically, this method estimates the slope θ of each point from the shadows in the overall image using the "shape from shading" method described by Berthold K. P. Horn in "Shape from Shading" (MIT Press, 1989).

A method of estimating slope θ using Horn's proposed shape from shading technique is described next.

The brightness of a landing surface can be expressed by equation 6 below when it is assumed that a Lambert surface (a diffuse reflection surface having constant reflectance) is illuminated by a single light source, such as the sun, from a sufficient distance.

$$I(x,y) = \rho(b,n) \quad \text{<Equation 6>}$$

Note that below the shape of the surface is defined by the function z=z(x,y), p=δz/δx, and q=δz/δy. The normal vector n at this time is represented by equation 7.

$$n = \frac{1}{\sqrt{1+p^2+q^2}}(-p,-q,1) \quad \text{<Equation 7>}$$

As a result, equation 6 can be restated in the form of equation 8.

$$I(x,y) = R(p,q) \equiv \frac{\rho(b_x p + b_y q - b_z)}{\sqrt{1+p^2+q^2}} \quad \text{<Equation 8>}$$

This is a first order nonlinear partial differential equation known as an irradiation equation. When selecting a site for landing on the surface of the moon, it should be noted that the reflectance of the soil in lunar oceans is different from the soil found in the lunar continents. Reflectance is substantially the same in the middle of the oceans or the middle of the continents, however, and the only real light source available during the lunar day is the sun. As a result, the relationship between lunar surface topography and image brightness can be thought of as being determined by the above irradiation equation. The shape from shading method is a technique for solving this equation as a partial differential equation.

Once p and q are obtained by solving this partial differential equation, the slope θ at each point can be calculated using the following equation 9.

$$\theta = \tan^{-1}\sqrt{p^2+q^2} \quad \text{<Equation 9>}$$

An area is determined to be level if this slope θ is other than a predefined value. The advantage of using this shape from shading method is thus that level areas can be detected more accurately.

Figure 6:
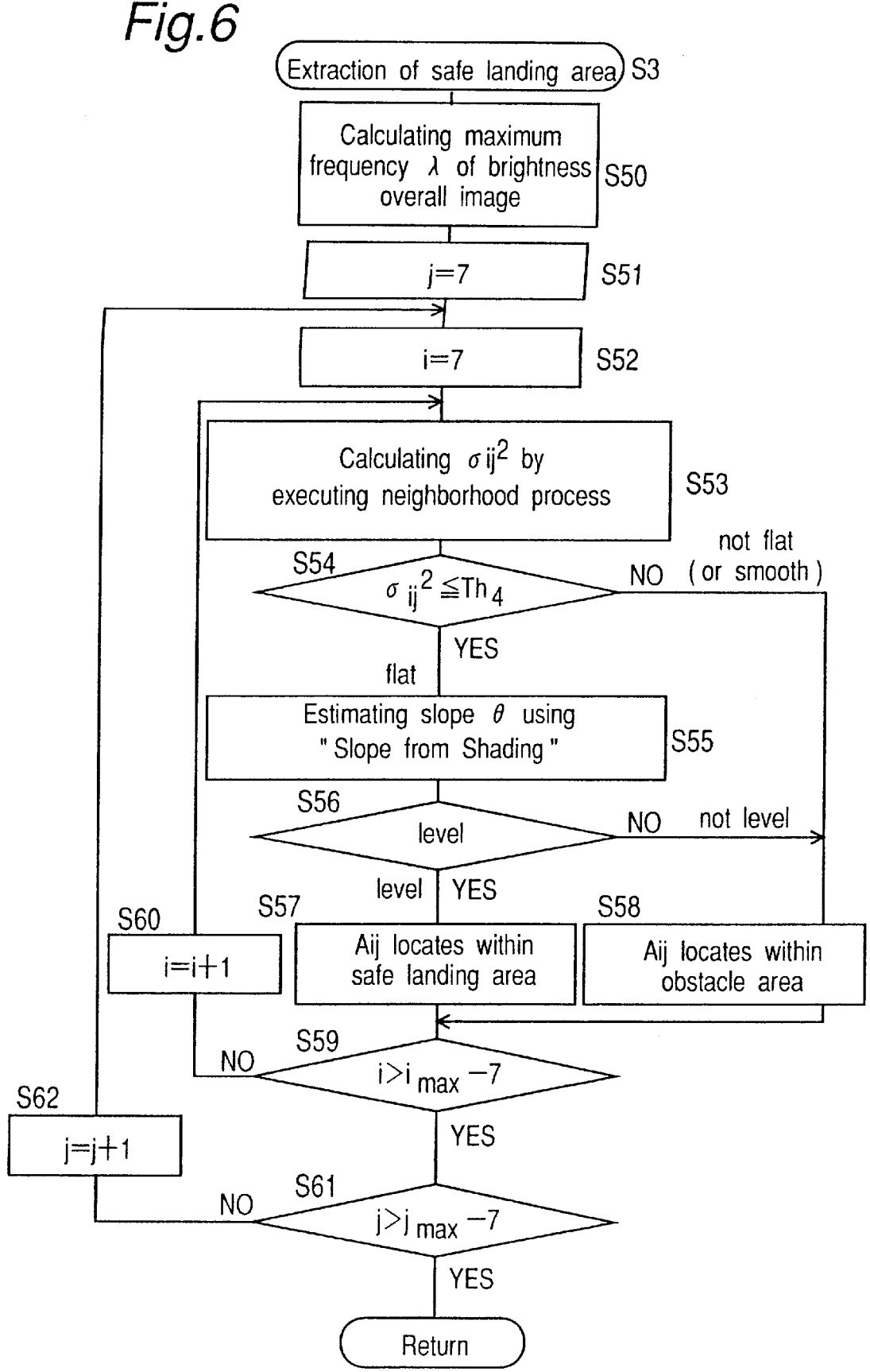
FIG. 6 is a flow chart of a third safe landing area extraction process performed as step S3 in FIG. 2.

FIG. 6 is a flow chart of a safe landing area extraction process according to this third version of the invention.

This process also starts by obtaining the maximum frequency λ of the brightness values for the overall image (step S50). The variables i and j, which are used to specify the center pixel $A_{ij}$ for the neighborhood process, are then initialized to j=7 (step S51) and i=7 (step S52).

The brightness variance $\sigma^2_{ij}$ (referred to below as local variance $\sigma^2_{ij}$) in each 15×15 pixel matrix is then calculated using equation 4 (step S53).

The local variance $\sigma^2_{ij}$ is then compared with a threshold value Th4. If the local variance $\sigma^2_{ij}$ is less than or equal to Th4, the area within the pixel matrix is determined to be smooth (step S54=yes). However, if the local variance $\sigma^2_{ij}$ is greater than Th4, the area within the pixel matrix is determined not to be smooth (flat) (step S54=no), and the pixel $A_{ij}$ is determined to be in an obstructed region in which safe landing is not possible (step S58).

However, if the area of the pixel matrix is determined to be smooth (step S54=yes), the slope θ of the area is estimated using Horn's Shape from Shading method described above (step S55). If the slope θ is less than a specific value (for example, 5 degrees), the area represented by the pixel matrix is determined to be level (step S56=yes), and the pixel $A_{ij}$ is therefore determined to be in a safe landing area (step S57). If an area is determined to have a slope θ greater than a specific value (step S56=no), the pixel $A_{ij}$ is determined to be in an obstructed region in which safe landing is not possible (step S58).

The variables are then tested and adjusted as described below so that the attributes of each pixel in the image are evaluated based on the neighborhood process and calculation results obtained as described above for every pixel in the image.

More specifically, if variable i has not been incremented to the value ($i_{max}$-7), where $i_{max}$ is the maximum x coordinate value in the image (step S59=no), variable i is incremented by one (i=i+1) (step S60), and the procedure then loops back to step S53. If variable i has been incremented to the value ($i_{max}$-7) (step S59=yes), variable j is similarly tested. That is, if variable j has not been incremented to the value ($j_{max}$-7), where $j_{max}$ is the maximum y coordinate value in the image (step S61=no), variable j is incremented by one (j=j+1) (step S62), and the procedure then loops back to step S52. When both variable i has been incremented to the value ($i_{max}$-7) (step S59=yes), and variable j has been incremented to the value ($j_{max}$-7) (step S61=yes), the process has been completed for every pixel in the image, and the safe landing area extraction process returns to the main routine shown in FIG. 2.

(4) Landing Site Selection

First and second methods of a landing site selection process performed as step S4 in FIG. 2 according to the present invention are described next with reference to the flow charts in FIGS. 7 and 8, respectively.

(4-1) First Landing Site Selection Process

Figure 7:
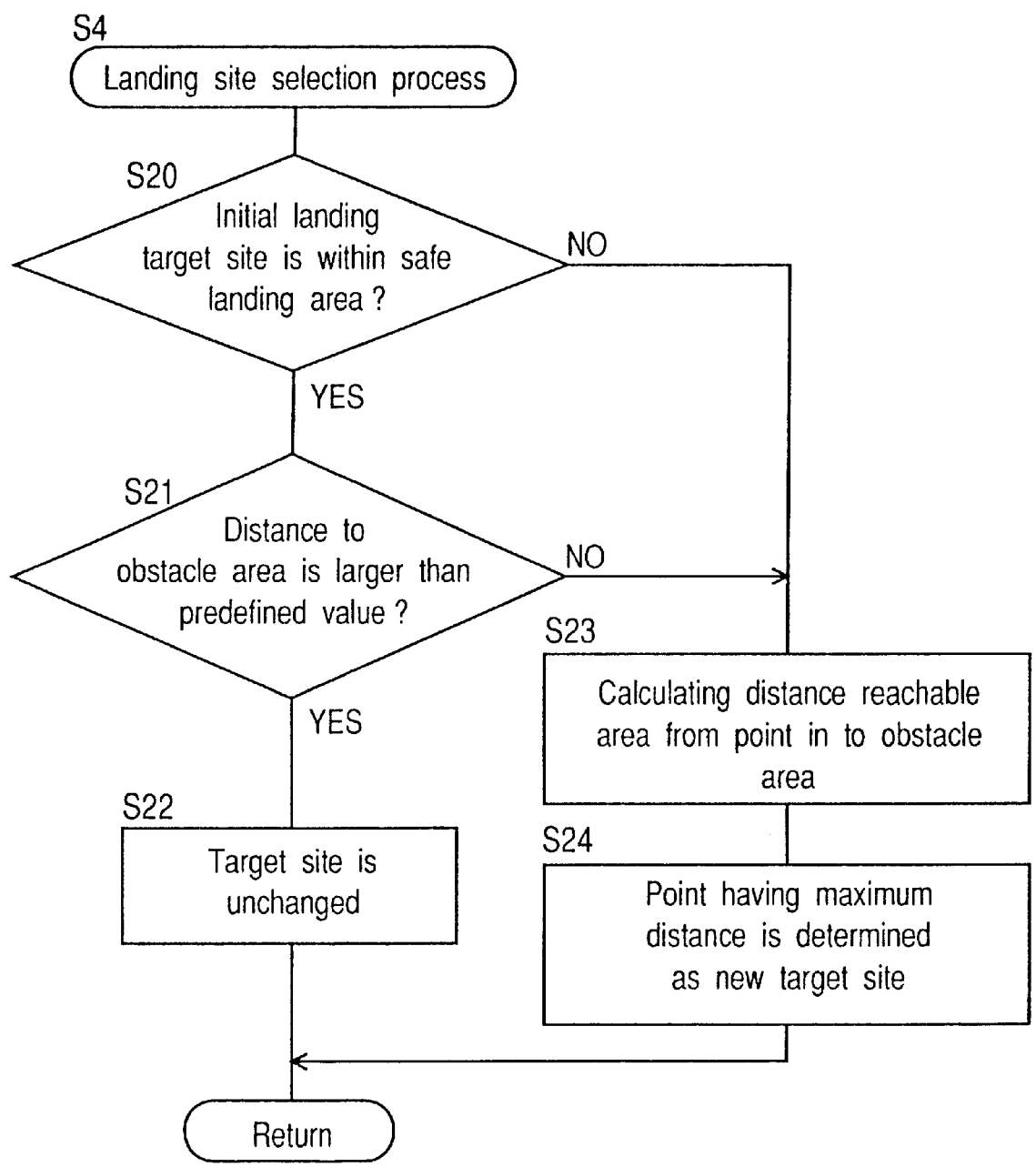
FIG. 7 is a flow chart of a first landing site selection process performed as step S4 in FIG. 2.

FIG. 7 is a flow chart of a first landing site selection process according to the present invention.

The first step is to determine whether the target landing site initially scheduled for the landing craft is within a safe landing area (step S20). If it is (step S20=yes), it is then determined whether a circular area of a specific diameter can be secured within the safe landing area (step S21). If the initial landing target is both within a safe landing area (step S20=yes) and an area of sufficient size can be secured (step S21=yes), the landing site is not changed (step S22), and the procedure returns directly to the main routine in FIG. 2.

It will be obvious to one with ordinary skill in the related art that the area to be secured as the landing site is not limited to a circular area, and can be varied as desired according to the shape of the landing craft or other considerations.

However, if there is an obstruction in the initial target landing site (step S20=no), or the initial target landing site is in a safe landing area but an area of a size sufficient to assure a safe landing cannot be secured (step S21=no), the diameter of each circular area that can be secured in a region in which the landing craft can land is calculated (step S23). The area with the largest diameter calculated in step S23 is then selected as the new target landing site (step S24), and the procedure returns to the main routine in FIG. 2.

(4-2) Second Landing Site Selection Process

A second landing site selection process according to the present invention selects as the final landing site an area circumscribed by a circle having a diameter equal to or greater than a specific size within a safe landing area, and closest to the initial target landing site.

FIG. 8 is a flow chart of a second landing site selection process according to the present invention.

The first step is to determine whether the target landing site initially scheduled for the landing craft is within a safe landing area (step S70). If it is (step S70=yes), it is then determined whether a circular area of a specific diameter can be secured within the safe landing area (step S71). If the initial landing target is both within a safe landing area (step S70=yes) and an area of sufficient size can be secured (step S71=yes), the landing site is not changed (step S72), and the procedure returns directly to the main routine in FIG. 2.

However, if there is an obstruction in the initial target landing site (step S70=no), or the initial target landing site is in a safe landing area but an area of a size sufficient to assure a safe landing cannot be secured (step S71=no), the diameter of each circular area that can be secured within a region in which the landing craft can land and move to is calculated in sequence from the initial target landing site (step S73). When an area having a diameter equal to or greater than a specific value is detected, that area is selected as the new target landing site (step S74), and the procedure returns to the main routine in FIG. 2.

This method of selecting a new landing site enables high speed detection of a new landing site.

(5) Process Results

FIG. 9 shows the results of the landing site selection process of the present invention when applied to image data from the lunar surface photographs (a) to (d) shown in row 1. Note that the photographs in row 1 are actual black and white photographs of the lunar surface.

The images (a) to (d) in row 2 show the results of a first landing site extraction process (step S3 in FIG. 4) for each of the corresponding images (a) to (d). Note that safe landing areas are shown as white. Based on this image, craters, slopes, and large surface depressions or bumps that would be an obstacle to a safe landing are designated as obstacles, and all other areas are considered safe for landing. It will also be known from these figures that even the irregularly shaped crater appearing at the top of photograph (b), and the two adjacent craters at the bottom of photograph (b), that is, obstacles that are difficult to model, are accurately recognized as obstacles to a safe landing by the method described.

In the images (a) to (d) in row 3, the initial target landing site is indicated by an x, and the area through which the landing craft can move between capturing the image and landing is indicated by the circle of which the center is the initial target site (x). The new landing site selected by the first landing site selection process (step 4 in FIG. 7) is indicated by a+in each figure, and the area that can be secured for landing is represented by the circle of which + is the center.

As will be understood from the results shown in FIG. 9, an image processing apparatus 100 according to the present invention can recognize with good precision all types of objects that would be an obstacle to a safe landing by a landing craft. In addition, when there is an obstacle to safe landing at the initial landing site targeted for the landing craft, the image processing apparatus 100 of the invention can select a different optimal safe landing site that can be reached by the landing craft before it lands.

(6) Other Versions of the Invention

An image processing apparatus according to a preferred embodiment of the invention has been described above. It should be noted, however, that while the overall average brightness $\mu$ of the image is used as the reference brightness of a level surface, the presence of extremely dark or extremely bright pixels in the image could bias the overall average brightness $\mu$ value and thus lower the precision of subsequent processes based on this average brightness $\mu$ value.

To avoid this problem, the median (M) of all pixel brightness values can be used in place of the average brightness $\mu$ value. When more than half of the landing site can be expected to be level and smooth, such as when landing is scheduled in a lunar ocean, using the median brightness value makes it possible to obtain a more appropriate brightness value for a level surface.

Effects of the Invention

A first image processing apparatus and a first image processing method according to the present invention apply a specific neighborhood process whereby local average and variance values are obtained based on brightness-related digital image data for image pixels in the area of a scheduled landing site. Based on the resulting local average and variance values obtained for each selected center pixel, it is then determined whether the center pixel is in a region that is level and flat.

A second image processing apparatus and a second image processing method according to the present invention obtain a local moment of inertia based on a sum of local variance values and the square of a difference between said local average values and a reference brightness value for a level surface. Whether a center pixel is in a level and flat area is then determined based on this local moment of inertia.

A third image processing apparatus and a third image processing method according to the present invention obtain local average and variance values of image pixel data in a neighborhood of a center pixel. The difference between the local average and a reference brightness for a level surface is then obtained, and the center pixel is determined to be in a level area when this difference is within a specific range. When the local variance value is less than or equal to a specific threshold value, the center pixel is also determined to be in a flat area.

A fourth image processing apparatus and a fourth image processing method according to the present invention recognize shadows based on data relating to the overall brightness of an image, and then use the recognized shadow information to calculate a slope at each image pixel. Finally, a center pixel is determined to be in a level area when the calculated slope is within a specific range. A neighborhood process also obtains local variance values for image pixel data in the area around a center pixel, and when the local variance value is less than or equal to a specific threshold value, the center pixel is determined to be in a flat area.

Compared with a conventional apparatus and method in which shadows are selected based simply on brightness information, and the detected shadows are used to define areas in which landing is not possible, the apparatus and method of the present invention in each of the above cases can accurately avoid obstacles that are not anticipated or are difficult to model, including overlapping craters, and can thus accurately detect safe landing sites in level and flat areas.

A fifth image processing apparatus and a fifth image processing method according to the present invention select as a new target landing site a pixel that is in a region determined to be flat and level, and is farthest in distance from a pixel that is determined to be in an area that is not flat or level. As a result, the center of an area in a region that is flat and level and has no obstacles in the surrounding area can be selected as a new target landing site, and a safe landing can be achieved for the landing craft.

A sixth image processing apparatus and a sixth image processing method according to the present invention select as a new target landing site a pixel that is in a region determined to be flat and level, is at least a specific distance from a pixel that is determined to be in an area that is not flat or level, and is nearest a specific predetermined target landing site. It is therefore possible to select as a new landing site an area that is flat, level, and large enough for landing, and is the shortest distance from a specific predetermined target landing site. The distance the landing craft must move from the original target landing site can thus be minimized, and a safe, fast landing can be achieved.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An imaging processing apparatus for identifying a soft landing location on the moon or planets, said image processing apparatus comprising:

an imaging unit for capturing an image of an area around a potential landing site, and outputting digital image data indicative of image brightness; and landing site extraction means for calculating local average brightness and brightness variance of image pixels located in a neighborhood of each pixel in the digital image data and determining whether each pixel represents a flat and level area based on the local average brightness and brightness variance, thereby identifying a desirable landing site.

2. The image processing apparatus for identifying a soft landing location on the moon of planets as set forth in claim 1, wherein the landing site extraction means comprises:

calculation means for calculating the local average brightness and brightness variance for each pixel, and calculating a local moment of inertia, defined as the sum of the local brightness variance and the square of a difference between the local average brightness and a reference brightness indicating a level surface; and evaluation means for determining that a center pixel represents a level and flat area when the local moment of inertia calculated by the calculation means is no larger than a threshold moment of inertia.

3. The image processing apparatus for identifying a soft landing location on the moon or planets as set forth in claim 1, wherein the landing site extraction means comprises:

calculation means for calculating the local average brightness and brightness variance for each pixel; and evaluation means for determining whether a center pixel represents a level area when a difference between the local average brightness and a reference brightness representing a level surface is within a range, and determining that the center pixel represents a flat area when the local brightness variance is no larger than a threshold brightness variance.

4. The image processing apparatus for identifying a soft landing location on the moon or planets as set forth in claim 1, wherein the landing site extraction means comprises:

calculation means for calculating the local brightness variance for each pixel, recognizing shadows in the image based on the image data, and calculating a slope at each pixel from recognized shadows; and evaluation means for determining that a center pixel represents a flat area when the local brightness variance is no larger than a threshold brightness variance, and determining that the center pixel represents a level area when the calculated slope is within a range.

5. The image processing apparatus for identifying a soft landing location on the moon or planets as set forth in claim 1, comprising landing site selection means for selecting as a new landing site a center point of a circular area having the greatest diameter of all circular areas that can be assured as flat and level areas determined by said landing site extraction means.

6. The image processing apparatus for identifying a soft landing location on the moon or planets as set forth in claim 1, comprising landing site selection means for selecting as a new landing site a center point of a circular area that has a diameter at least equal to a specific diameter, and is closest to a potential landing site from all circular areas that can be assured as representing flat and level areas determined by said landing site extraction means.

7. An image processing method for identifying a soft landing location on the moon or planets, said image processing method comprising:

- capturing digital image data indicative of image brightness in an image of an area around a potential landing site;
- calculating local average brightness and brightness variance of pixels located in a neighborhood of each pixel in the digital image data,
- determining whether each pixel represents a level and flat area based on the local average brightness and brightness variance, and
- extracting a desirable landing site from the level and flat areas.

8. The image processing method as set forth in claim 7, wherein extracting a desirable landing site comprises:

- calculating local average brightness and brightness variance of pixels in a neighborhood of each pixel, and calculating a local moment of inertia, defined as the sum of the local brightness variance and the square of a difference between the local average brightness and a reference brightness for a level surface; and
- determining that a pixel represents a level and flat area when the local moment of inertia calculated is no more than a threshold moment of inertia.

9. The image processing method as set forth in claim 7, wherein extracting a desirable landing site comprises:

- calculating the local average brightness and brightness variance of pixels in a neighborhood of each pixel; and
- determining that a pixel represents a level area when a difference between the local average brightness and a reference brightness for a level surface is within a range, and determining that a pixel represents a flat area when the local brightness variance is no larger than a threshold brightness variance.

10. The image processing method as set forth in claim 7, wherein extracting a desirable landing site comprises:

- calculating local brightness variance of pixels in a neighborhood of each pixel, recognizing shadows in the image data, and calculating a slope at each pixel from the recognized shadows; and
- determining that a pixel represents a flat area when the local brightness variance is no more than a threshold brightness variance, and determining that a pixel represents a level area when the calculated slope is within a range.

11. The image processing method as set forth in claim 7, comprising selecting as a new landing site a center point of a circular area having the greatest diameter of all circular areas assured to be flat and level areas determined in extracting a desirable landing site.

12. The image processing method as set forth in claim 7, comprising selecting as a new landing site a center point of a circular area that has a diameter at least equal to a specific area, and is closest to a potential landing site of all circular areas assured to be flat and level areas as determined in extracting a desirable landing site.

* * * * *